(No Model.)
A. BRUNER.
UNDERGROUND ELECTRIC CONDUIT.
No. 423,023. Patented Mar. 11, 1890.
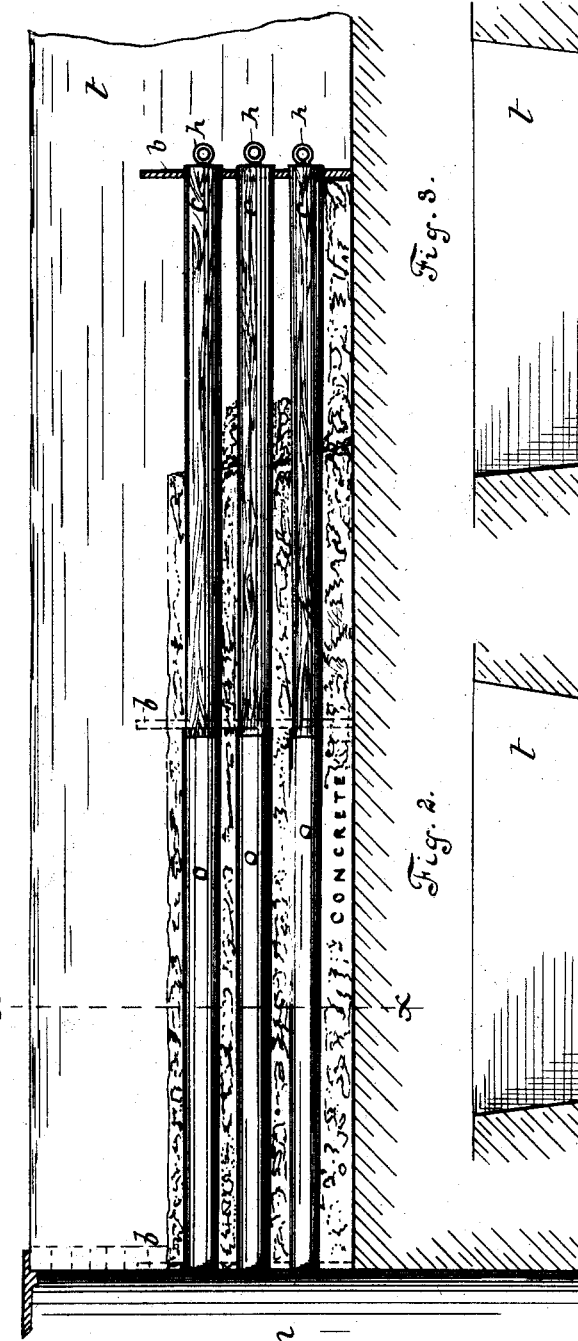
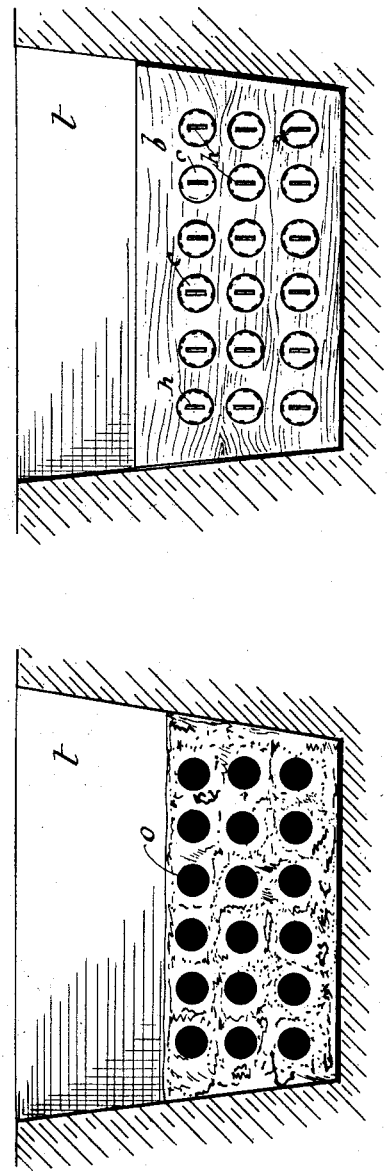
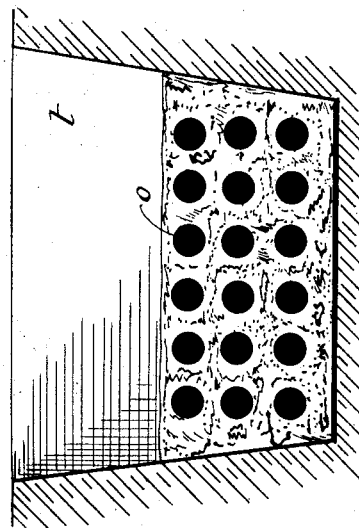

UNITED STATES PATENT OFFICE.

AUGUSTUS BRUNER, OF INDIANAPOLIS, INDIANA.

UNDERGROUND ELECTRIC CONDUIT.

SPECIFICATION forming part of Letters Patent No. 423,023, dated March 11, 1890.

Application filed November 11, 1889. Serial No. 329,834. (No model.)

*To all whom it may concern:*

Be it known that I, AUGUSTUS BRUNER, of Indianapolis, county of Marion, and State of Indiana, have invented certain new and useful Improvements in Conduits; and I do hereby declare that the following is a full, clear, and exact description thereof, reference being had to the accompanying drawings, in which like letters refer to like parts.

My invention relates to the construction of conduits for wires or cables, and will be understood from the following description.

The main objects of my invention are to provide a cheap, secure, and water-tight conduit for electric wires or cables, and to facilitate the laying of the same and to economize the cost of construction, while at the same time the strength of the whole conduit is increased rather than diminished.

In the drawings, Figure 1 represents a side of an open trench in which my method of making conduits is under way, one section being completed and the next one begun. Fig. 2 is a cross-section on the line $x\,x$, Fig. 1, the cores having been withdrawn, leaving the openings for the wires ready for use. Fig. 3 is an end view showing the heading-board in place and supporting the ends of the cores, which have not yet been withdrawn.

In detail, $t$ is a trench, at the beginning of which an excavation or man-hole $m$ is formed, as shown in Fig. 1. At the bottom of this trench is placed about three inches of concrete, and upon this wooden cores $c$, having handles $h$, are laid, their outer ends being a little larger than the inner to facilitate the withdrawal of the cores after the mass has been set, and these outer ends are supported in the heading-board $b$, which has holes to receive and support them. The heading-board having been set in place, two or three series of cores one above the other, as many as may be desired, are set in place in the first section. The inner ends of these cores are supported by a like heading-board, which is shown in the dotted lines in the center in Fig. 1. The concrete is then filled in and carefully set about and between the cores, so as to make a solid homogeneous mass from bottom to top, and after this has stood long enough to set firmly the cores $c$ are carefully withdrawn through the opening in the heading-board, and the latter is then removed. The end of the completed section will then have the appearance of that shown in Fig. 2 of the drawings, the interior having a smooth hard firm surface free from lumps or projections of any kind. The second section is constructed in the same way; but at the inner end a heading-board is not necessary, as the ends of the cores may be supported in the openings $o$, but the heading-board is placed at the opposite end, as shown at the right hand in Fig. 1, and the work is proceeded with in the same manner as before. After the mass is set the cores are withdrawn, the heading-board taken out, and a third section is begun and completed in the same way.

Wood being the lightest to handle, is preferable for that reason for the cores; but if it should be found that it would be inclined to stick in the openings metal ones may be used. These are preferably ten or twelve feet long, or of such size as will make them easy to handle, considering the weight of the material used in their construction, and, being tapered slightly, in a distance of ten feet there will be a difference in diameter of one-sixteenth to one-eighth of an inch between the two ends of the cores. This method of construction dispenses entirely with the use of metal or vitrified pipe, the walls of the openings being formed of a mass of cement. All this being thoroughly mixed and settled between and around the cores becomes homogeneous, and each part will help to support and maintain the other parts of the structure, and it is not liable to be broken, and no joints are necessary.

What I claim as my invention, and desire to secure by Letters Patent, is the following:

The process of constructing conduits which consists in placing a layer of concrete in a trench and setting one or more series of independent cores therein above each other, held in position at one end by a head-board, the other end of the cores being supported by the openings of the last section made, and filling in about the cores with a mass of homogeneous cement or similar material, allowing such mass to settle, and then withdrawing the cores, substantially as described.

In witness whereof I have hereunto set my hand this 9th day of November, 1889.

AUGUSTUS BRUNER.

Witnesses:
C. P. JACOBS,
E. B. GRIFFITH.